June 2, 1970    J. L. KING, JR    3,515,249
TORQUE SENSITIVE RELEASING MEANS FOR SPRAG CLUTCHES
Filed June 5, 1969
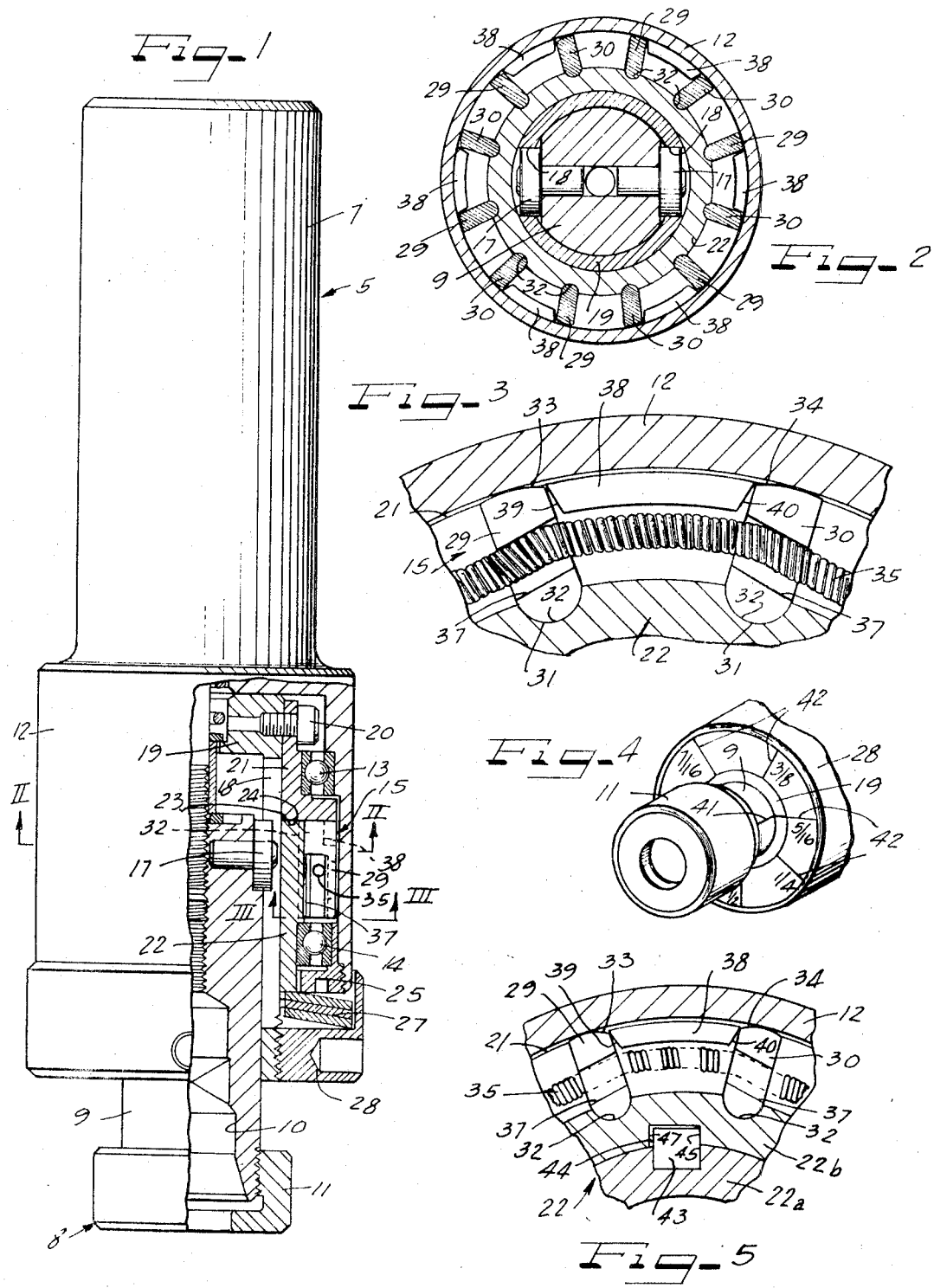
INVENTOR.
JOHN L. KING, JR
ATTORNEYS

United States Patent Office 3,515,249
Patented June 2, 1970

3,515,249
TORQUE SENSITIVE RELEASING MEANS FOR SPRAG CLUTCHES
John L. King, Jr., Frankenmuth, Mich., assignor to Houdaille Industries, Inc., Buffalo, N.Y., a corporation of Delaware
Continuation-in-part of application Ser. No. 715,855, Mar. 25, 1968. This application June 5, 1969, Ser. No. 830,654
Int. Cl. F16a 41/07, 43/20; B25b 21/00
U.S. Cl. 192—45.1                                    16 Claims

ABSTRACT OF THE DISCLOSURE

Apparatus such as a tool driver liable to excessive torque in operation comprises first and second portions in concentric relatively rotatable assembly having respective annular oppositely radially facing spaced areas or races with circumferentially spaced one-way clutch sprags normally biased to effect corotation of the portions in response to rotary movement of one of the portions, and torque-sensitive means including a torque-releasable clutch connecting one of said areas to its portion of the apparatus and sprag-releasing lugs on the same portion of the apparatus operative when the clutch releases said one area to release the sprags.

---

This is a continuation-in-part of application Ser. No. 715,855, filed Mar. 25, 1968, and now abandoned.

This invention relates to torque sensitive releasing means and is more particularly concerned with overload release means for sprag clutches.

In various apparatus, of which power tool holders are representative, excessive torque during operation may result in breakage or damage in respect to a tool, the holder, the driving machine, the workpiece, and the like. For example, in the use of a tap driver any of a variety of conditions may result in an excessive torque load, i.e., bottoming out of the tap, a dull tap, lack of lubrication, a hard spot in the workpiece, and other causes.

Accordingly, it is an important object of the present invention to provide new and improved means for relieving rotary apparatus from torque overload.

Another object of the invention is to provide new and improved torque-sensitive release means for sprag clutches.

A further object of the invention is to provide a new and improved automatic torque-sensitive clutch releasing structure.

Still another object of the invention is to provide a new and improved adjustable torque-sensitive releasing device especially suitable for sprag clutches.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a side elevational view, partially in section, of a rotary apparatus represented by a power tool holder, and more particularly a tap holder, embodying features of the invention;

FIG. 2 is a transverse sectional detail view taken substantially along the line II—II of FIG. 1;

FIG. 3 is an enlarged fragmentary transverse sectional detail view taken substantially along the line III—III of FIG. 1;

FIG. 4 is a fragmentary isometric view of the tool socket end portion of the holder of FIG. 1 showing the arrangement of means for gauging adjustment of torque sensitivity of the release means; and FIG. 5 is a view similar to FIG. 3 but showing a modification.

In the representative illustrated apparatus, a tool holder is shown comprising a first portion 5 including a shank 7, and a second portion 8 comprising a tool receiving nose 9 having therein a tool socket 10 opening from its outer end and carrying a tool retaining nut 11. The portions 5 and 8 are assembled in relatively rotatable relation, with the nose 9 comprising an elongated cylindrical member which extends concentrically into a hollow substantially cup-shaped head 12 on the shank 7.

Although the portions 5 and 8 must corotate operatively, they are connected relatively rotatably on axially spaced anti-friction bearings 13 and 14, with releasable clutch means 15 maintaining the operational corotational relation. To this end, the nose portion 8 has on the tool socket nose member 9 within the head 12 diametrically opposite rollers 17 engaging within respective longitudinal slots 18 in a sleeve member 19 within which the nose member 9 is engaged and about the inner end portion of which is secured as by means of screws 20 an annular generally L-shaped flange member 21 providing a seat for the inner race of the bearing 13, the outer race of which is mounted in the inner wall of the hollow head 12.

Mounting of the bearing 14 and the clutch 15 is effected through the medium of an annular releasable coupling member 22 which is in slidable telescopically related engagement about the sleeve 19 and has an inner annular end face 23 in frictional slip clutch engagement with a confronting annular slip clutch end face surface 24 on the flange member 21. Adjacent to its opposite end, the member 22 is engaged by the inner race of the bearing 14, while the outer race is engaged by a retaining ring nut 25 threadedly engaged within the outer end of the head 12. Through this arrangement, it will be observed, that the portions 5 and 8 of the tool holder are capable of full relative rotary movement.

Normally, the annular coupling member 22 is thrust with adjustable pressure toward the flange 21 by means of spring washers 27, also known as Belleville springs, thrusting against the outer end of the coupling member under predetermined compressive load as effected by a ring nut 28 threaded onto the outer end portion of the sleeve 19.

In a preferred arrangement, the clutch 15 comprises two sets of sprags 29 and 30 alternating with each other and disposed in uniformly circumferentially spaced relation in the annular space provided therefor by the respective annular oppositely radially facing areas of the apparatus portions 5 and 8 afforded by the inner wall of the head 12 and the annular coupling member 22. Each of the sprags 29 and 30 has a radially inner pivot base edge 31 freely pivotally slidably engaged in a complementary socket 32 in the annular clutch area provided by the coupling member 22. On their opposite edges, the sprags 29 have respective one-way clutch faces 33, and the sprags 30 have on the same edges oppositely operable clutch faces 34. These clutch faces 33 and 34 are operatively respectively engageable with the confronting annular area of the wall of the head 12, the clutch faces 33 being clutchingly engageable in one rotary direction in which the clutch faces 34 will automatically release, and the clutch faces 34 are clutchingly engageable in the opposite rotary direction and in which the clutch faces 33 will automatically release, as determined by the respective curvatures of the clutch faces 33 and 34. Normally the sprags 29 and 30 are biased toward the clutching engagement with the wall of the head 12 by a suitable garter spring 35, which is expansible as shown but may be contractile if preferred, extending through respective slots 37 provided for this purpose in the sprags. Through this arrangement, rotation of the shank 7 in either direction is adapted to effect corotation of the tool holding nose 9 in the same direction by operation of the clutch 15. During clockwise rotation of the shank head 12 as seen in FIGS. 2 and 3, the clutch sprags 29 effect the clutching action. During counterclockwise rotation, the clutch sprags 30 function. If preferred, the shank 7 may be held stationary and a workpiece rotated, or both the shank 7 and the workpiece may be relatively rotated. Whichever way is preferred, the two portions 5 and 8 of the tool holder will be clutched for corotation by the clutch mechanism 15.

According to the present invention, means are provided for automatic torque sensitive overload release of the clutch 15. For this purpose, the flange member 21 is provided with sprag-tripping means comprising a clutch-releasing lug 38 between each companion pair of the sprags 29 and 30 and adjacent to the low edges of the respective clutch faces 33 and 34. The construction and relationship of the parts is such that normally the sprags may function without interference from the tripper lugs 38. However, when a torque relationship between the parts 5 and 8 develops which is greater than a predetermined maximum, torque sensitive release is effected because the coupling sleeve 22 is normally locked corotatably with the head 12 by the sprag clutch, the slip clutch faces 23 and 24 will slidably release in response to the torque overload, permitting relative angular torsional displacement between the coupling sleeve 22 and the remainder of the apparatus portion 8. This results in the sprag-releasing trippers 38 moving against and tripping and releasing the clutching sprags. Thereby the portion 5 or 8, as the case may be, will run free relative to the other portion until the torque overload condition has been corrected.

In their sprag-releasing function, the respective lugs 38 thrust against the sides of the affected sprags closely adjacent to or at the low side run out of the respective clutching end faces 33 or 34 of the sprags. Thus, the lugs 38 have respective thrusting edges 39 which are normally close to the clutch face edges of the confronting sides of the sprags 29. At their opposite sides, the lugs 38 have similar respective thrust edges 40 which are normally located close to the clutch face run out edges of the confronting sides of the sprags 30. Although the thrust edges 39 and 40 may normally touch the confronting sprags, there may be a slight normal gap, depending on the degree of release sensitivity preferred.

After a de-clutching by the lugs 38 has occurred, reversing the drive, as in a tap holder to back the tap out of the hole in the workpiece after an overload torque condition has caused de-clutching, will reset the sprag clutch for corotation of the portions of the apparatus. Thus when the drive is reversed, initial resistance of the tool to the reversal, and the torsional elasticity of the component parts of the apparatus, will result in slight relative reversed shifting at the slip clutch faces 23 and 24 so that, in effect, there is a resetting angular movement of the flange 21 relative to the coupling member 22 whereby the releasing lugs 38 are backed away from their sprag-releasing position so that the released sprags are reset by the spring 35 for clutching operation in the next operating cycle of the apparatus.

By reason of the adjustable spring bias of the slip clutch coupling member 22 through the spring washer assembly 27 by means of the nut 28, adjustment to establish a predetermined torque-releasing safety level is simple and easy. In a tool-driving holder, such as a tap holder, it is advantageous to adjust the torque level for different sizes of tool. To facilitate such adjustment, visible indexing means are desirably provided, herein comprising a guide mark or line 41 (FIG. 4) on the exposed portion of the nose member 9, and respective index marks or lines 42 on the adjacent exposed end face of the nut 28. The several index marks 42 are desirably identified, in a tap holder, by the size of tap for which appropriate adjustment is effected by aligning any selected one of the index marks with the guide mark 41. Thereby the most efficient torque release level is attained for any given size of tool.

In order to compensate for situations where the initial resistance of the tap may not be enough during a turn-out movement of the tool holder to ensure sufficient relative motion for complete restoration of the releasing lugs 38 to their backed-away, sprag-releasing position, means may be provided to enable such restoration movement automatically during turn-out or reversing movement of the tool. To this end, a limited lost motion connection is provided in the sleeve member 22 by dividing it into two relatively rotatable telescoped parts (FIG. 5), 22b which carries the sprags and 22a which is in slip clutch engagement with the part 21 and the biasing spring assembly 27. A key 43 is fixed in one of the sleeve parts, herein 22a, and extends across the confronting faces of the sleeve parts into a lost motion keyway 44 in the sleeve part 22b. Within the keyway 44, which is just enough wider than the key 43 to provide the desired lost motion clearance, the key 43 has lost motion movement in either circumferential direction to perform the sprag back-off function in the initial back-out or reverse or release turning of the tool. During a counterclockwise movement of the part 22b relative to the part 22a the key 43 engages a stop shoulder 45 of the keyway 44 and in a clockwise relative movement of the part 22b, the key 43 engages an opposite keyway shoulder 47. The lost motion thus permitted restores the affected sprags to their neutral or non-clutching relation and the function of the other elements of the tool holder may be as described hereinbefore.

I claim as my invention:

1. In apparatus comprising complementary portions in concentric relatively rotatable assembly but which must corotate operatively:
respective annular oppositely radially facing areas of said portions being in spaced confronting relation;
circumferentially spaced one-way clutch sprags rockably mounted in respect to one of said areas and operative to engage the other of said areas in releasable clutching relation whereby to effect corotation of said portions in response to rotary movement of one of said portions;
means normally biasing said sprags into said clutching relation; and
torque-sensitive means for releasing said sprags comprising a torque-releasable connection between, and normally operative to maintain corotation of, said one area and its portion of the apparatus and means carried by said last-mentioned portion of the apparatus operative upon torque-released relative rotation of said one area and its portion of the apparatus to release said sprags.

2. Apparatus according to claim 1, said means carried by said last-mentioned portion of the apparatus comprising sprag-tripping lugs normally free from said sprags but engaging with said sprags operative to release said sprags.

3. Apparatus according to claim 1, said one area being on an annular member relatively rotatably mounted on its portion of the apparatus and having an axially facing clutch surface frictionally confronting a complementary clutch surface on said its portion of the apparatus, and biasing means effecting a bias of said clutch surfaces frictionally against one another.

4. Apparatus according to claim 3, comprising means for adjusting the biasing thrust imparted by said biasing means.

5. Apparatus according to claim 1, said torque sensitive means including a limited lost motion connection between said one area and its portion of the apparatus.

6. In apparatus comprising complementary portions in concentric relatively rotatable assembly but which must corotate operatively:
respecitve annular oppositely radially facing areas of said portions being in spaced confronting relation;
said annular area of one of said portions comprising a cylindrical surface and the annular area of the other of said portions being on an annular coupling member;
circumferentially spaced one-way clutch sprags carried pivotally by said member and said sprags effecting clutching engagement with said cylindrical surface to effect corotation of said portions in response to rotary movement of either of said portions; and
torque-sensitive means for releasing said sprags comprising a slip clutch connection normally maintaining said member and said other of said portions corotative, but releasable in response to predetermined torque, and sprag-releasing lug means carried by said other of said portions and fixedly corotative therewith.

7. In apparatus comprising complementary portions in concentric relatively rotatable assembly but which must corotate operatively:
respective annular oppositely radially facing areas of said portions being in spaced confronting relation;
circumferentially spaced one-way clutch sprags operative on and between said areas to effect corotation of said portions in response to rotary movement of one of said portions;
said radially facing area of the other of said portions comprising a member relatively rotatably mounted with respect to said other of said portions;
a slip clutch adjustably connecting said member corotatably with said other of said portions and releasable in response to predetermined relative torque forces on said portions; and
sprag-tripping means permanently corotative with said other of said portions and operative in response to relative torsional displacement of said portions incident to torque release of said slip clutch.

8. In apparatus comprising complementary portions in concentric relatively rotatable assembly but which must corotate operatively:
respective annular oppositely radially facing areas of said portions being in spaced confronting relation;
circumferentially spaced one-way clutch sprags operative to effect corotation of said portions in response to rotary movement of one of said portions comprising two sets of alternately oppositely operable clutch sprags located by oppositely operable pairs circumferentially on and between said areas; and
torque-sensitive overload release means for said sprags operable to release one of said sets of sprags for overload release during rotary movement in one direction and being operable to release the other of said sets of sprags for overload release during rotary movement in the opposite direction.

9. Apparatus according to claim 8, said torque-sensitive means comprising respective releasing lugs located between said pairs of sprags and having thrust surfaces located in conforming relation to clutch surfaces of said sprags.

10. In apparatus comprising complementary portions in concentric relatively rotatable assembly but which must corotate operatively, respective annular oppositely radially facing areas of said portions being in spaced confronting relation, and circumferentially spaced one-way clutch sprags operative to effect corotation of said portions in response to rotary movement of one of said portions:
said first portion comprising a tool holder including a shank having a hollow head within which one of said areas comprises a cylindrical surface;
said second portion comprising a tool engaging nose;
anti-friction bearing means supporting said second portion rotatably within said head;
an annular member carried relatively rotatably on said second portion and providing the radially facing area thereon;
said sprags being pivotally mounted on said member and having clutch faces engageable with said cylindrical surface;
means normally biasing said sprags to effect clutching engagement of said clutch faces with said cylindrical surface;
a torque releasable clutch normally connecting said member with said second portion; and
tripper lugs carried fixedly by said second portion and operable incident to relative rotary movement of said portions during torque release of said clutch to disconnect said sprags from clutching engagement of said clutch faces with said cylindrical surface.

11. Apparatus according to claim 10, including adjustable biasing means carried by said second portion to effect predetermined torque responsiveness of said clutch.

12. Apparatus according to claim 11, including indexing means for determining various torque-responsive settings for said adjustable biasing means.

13. Apparatus according to claim 10, said clutch being a slip clutch comprising a clutch surface on said member, a flange fixedly carried by said second portion and having a slip clutch face engaged by said surface, said tripper lugs being integral with said flange.

14. Apparatus according to claim 13, said flange and said member providing bearing supports for said second portion.

15. In apparatus comprising complementary portions in concentric relatively rotatable assembly but which must corotate operatively:
respective annular oppositely radially facing areas of said portions being in spaced confronting relation;
circumferentially spaced one-way clutch sprags operative to effect corotation of said portions in response to rotary movement of one of said portions; and
torque-sensitive means for releasing said sprags including a limited lost motion connection between one of said areas and its portion of the apparatus, enabling relative torque resistance rotary movement therebetween, and trippers operative as an incident to said rotary movement to release said sprags.

16. Apparatus according to claim 15, said one area comprising an annular coupling member having relatively rotatably telescopically related parts, and said lost motion connection comprising a key corotatively fixed to one of said parts and extending into a keyway, in the other of said parts, of greater circumferentially extending width than the portion of said key extending thereinto.

References Cited
UNITED STATES PATENTS

| | | | |
|---|---|---|---|
| 1,664,874 | 4/1928 | Constantinesco | 192—56 XR |
| 2,938,613 | 5/1960 | Williams | 192—45.1 XR |
| 3,094,195 | 6/1963 | Lund | 192—45.1 XR |
| 3,164,234 | 1/1965 | Tamarin | 192—45.1 XR |
| 3,335,832 | 8/1967 | Candela | 192—45.1 XR |

MARK M. NEWMAN, Primary Examiner

A. D. HERRMANN, Assistant Examiner

U.S. Cl. X.R.
81—52.4; 192—56